United States Patent [19]

Gell, Jr.

[11] Patent Number: 4,853,722

[45] Date of Patent: Aug. 1, 1989

[54] METHOD AND APPARATUS FOR EXTENDING THE DEPTH RANGE OF UNDERWATER EQUIPMENT

[75] Inventor: Harold A. Gell, Jr., Silver Spring, Md.

[73] Assignee: Sea Fathoms Industries, Silver Spring, Md.

[21] Appl. No.: 243,596

[22] Filed: Sep. 12, 1988

U.S. PATENT DOCUMENTS

| | | | |
|---|---|---|---|
| 1,131,712 | 3/1915 | Klein | 354/64 X |
| 3,162,107 | 12/1964 | Byers | 354/64 |
| 3,717,078 | 2/1973 | Oqura | 354/64 |
| 3,759,605 | 9/1973 | Johnson | 354/64 X |
| 4,041,507 | 8/1977 | Ko et al. | 354/64 |
| 4,113,137 | 9/1978 | Wind | 220/319 |
| 4,281,343 | 7/1981 | Monteiro | 354/64 X |

FOREIGN PATENT DOCUMENTS

| | | | |
|---|---|---|---|
| 1,043,770 | 6/1953 | France | 354/64 X |
| 2,926,224 | 1/1980 | W. Germany | 354/64 X |

Related U.S. Application Data

[63] Continuation-in-part of Ser. No. 113,913, Oct. 29, 1987, Pat. No. 4,771,299, and a continuation-in-part of Ser. No. 85,336, Aug. 13, 1987, Pat. No. 4,771,320, and a continuation-in-part of Ser. No. 85,336, Aug. 14, 1987.

[51] Int. Cl.$^4$ ............................................. G03B 17/08
[52] U.S. Cl. ..................................... 354/64; 114/312
[58] Field of Search .......................... 354/64; 114/312

Primary Examiner—Michael L. Gellner
Attorney, Agent, or Firm—Harold A. Gell, Jr.

[57] ABSTRACT

An apparatus for extending the depth range of an underwater pressure hull such as an underwater camera body by providing a means responsive to ambient pressure for equalizing the pressure between the hull and its environment.

38 Claims, 7 Drawing Sheets

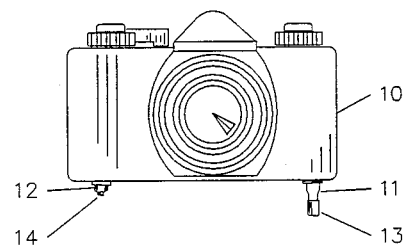
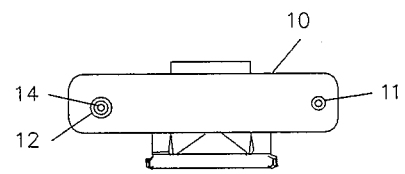
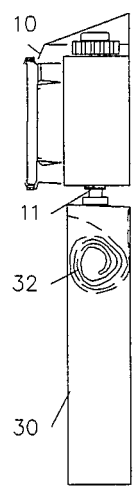
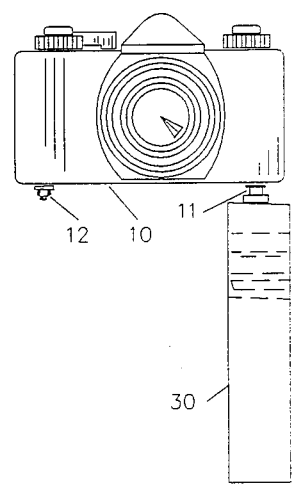
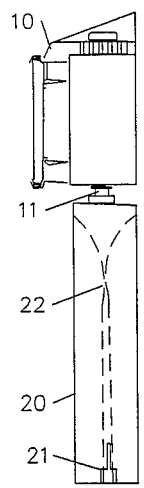
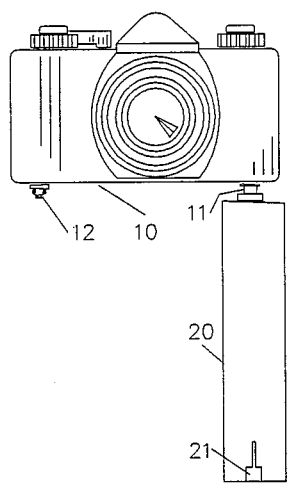
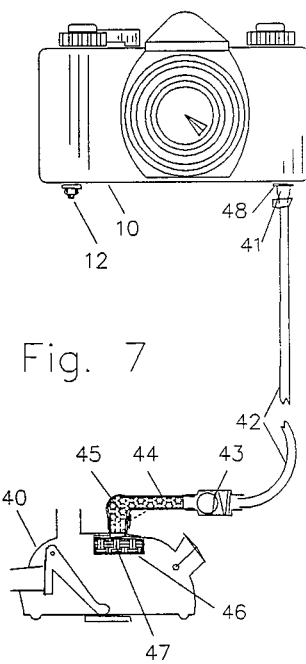
Fig. 1
Fig. 2
Fig. 6
Fig. 5
Fig. 4
Fig. 3
Fig. 7

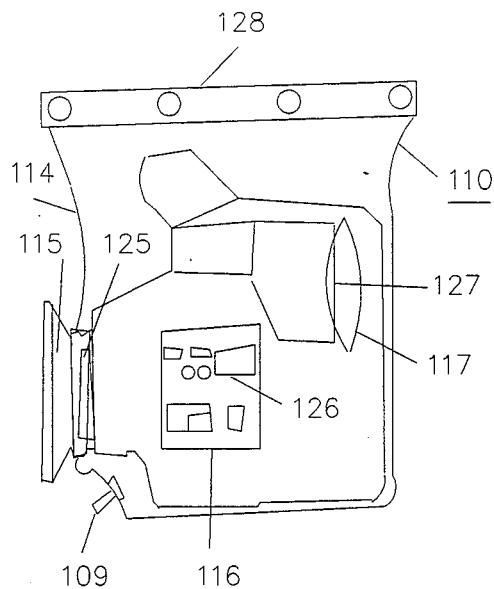
Fig. 13
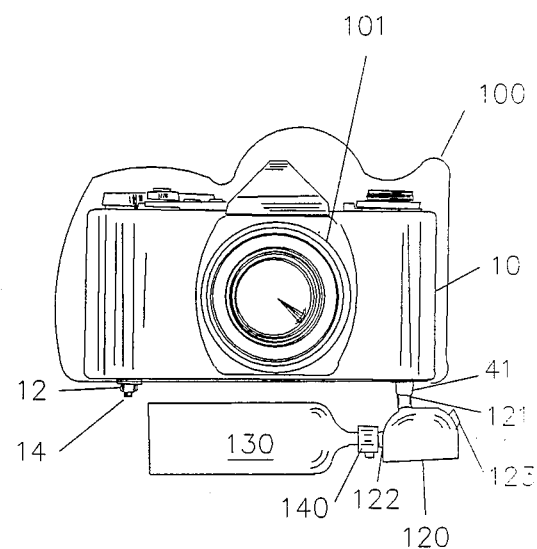
Fig. 14
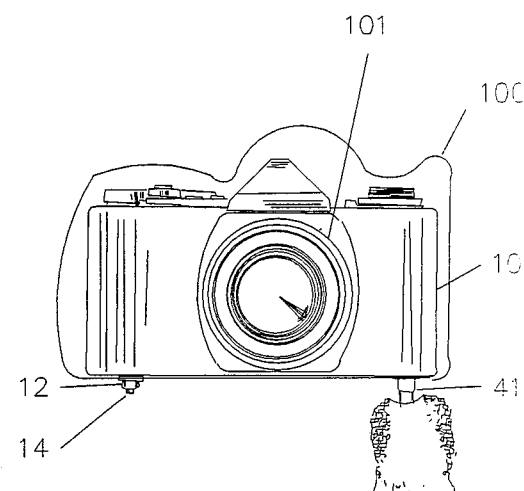
Fig. 15
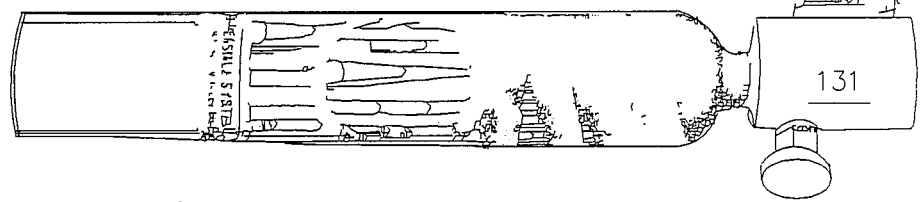

METHOD AND APPARATUS FOR EXTENDING THE DEPTH RANGE OF UNDERWATER EQUIPMENT

RELATED APPLICATIONS

This is a continuation-in-part of U.S. patent application Ser. No. 07/113,913 filed Oct. 29, 1987 for "Method And Apparatus For Underwater Operation Of Non-Waterproof Equipment" and issued Sept. 13, 1988 as U.S. Pat. No. 4,771,299 and U.S. patent application Ser. No. 07/085,336 filed Aug. 14, 1987 for "Method And Apparatus For Extending The Depth Range Of Underwater Equipment" and issued Sept. 13, 1988 as U.S. Pat. No. 4,771,320.

FIELD OF THE INVENTION

The present invention relates to a means to increase the depth range of an underwater pressure hull such as an underwater camera by balancing the internal pressure of the hull with the exterior ambient pressure.

BACKGROUND OF THE INVENTION

Recent achievements in the microprocessor control field have led to the development of underwater cameras which utilize the basic camera case as the pressure hull. The majority of cameras of this type have a maximum operating limit from 3 to 10 meters. Operations within this range are accomplished with minimal changes to the basic camera bodies and therefore the camera price may be held low.

A few attempts have been made to increase the strength of the structure of the camera body so that the cameras may be utilized at greater depths and therefore render the cameras more practicable for underwater use. The maximum depth obtainable by increasing the camera structure is approximately 30 meters but the increased costs necessitated by the stronger camera body more than triples the retail cost of the camera, placing it out of range for the average sport diver.

OBJECTIVES OF THE INVENTION

A principle and primary objective of the present invention is to provide a means for pneumatically connecting a pressure hull to a relatively high pressure source of gas wherefrom the pressure hull may "breathe" and thus maintain an internal pressure approximately equal to ambient pressure.

Another objective of the present invention is to provide a source of pressurized gas and a pressure reducing regulator adapted to enable the pressurized gas source to maintain the internal pressure of an associated system at approximately ambient pressure.

Another objective of the present invention is to provide a means to couple the second stage regulator of a self-contained underwater breathing apparatus to a camera whereby the internal pressure of the camera system is maintained at approximately ambient pressure in response to gas supplied by the second stage regulator.

It is a primary objective of the present invention to provide a means for pressure compensating the interior of a waterproof enclosure to approximate the ambient pressure.

It is a primary objective of the invention to provide a means whereby the operating depth of an underwater camera may be increased without increasing the physical structure.

Another objective of the invention is to provide a method for operating an underwater camera where the camera body is by the regulator of an underwater breathing apparatus.

A still further objective of the invention is to provide a camera including means to pressurize the camera in response to ambient pressure.

Another objective of the invention is to provide a method for operating a video camera underwater by encasing the video camera in a flexible waterproof container.

A further objective of the invention is to provide a flexible underwater container and means to pressurize the container in response to ambient pressure encountered during an underwater dive.

Another objective of the invention is to provide a means to seal the breathing port of an underwater breathing apparatus to cause the apparatus to "breathe" in through its high pressure inlet and out through its exhaust valve means so that the chamber between input and output is maintained of approximately the external ambient pressure.

Another objective of the invention is to provide a means to seal the breathing port of an underwater breathing apparatus to cause the apparatus to "breathe" in through its high pressure inlet and out through its exhaust valve means so that the chamber between input and output is maintained of approximately the external ambient pressure and provide a means for pneumatically connecting a pressure hull to said chamber whereby the internal pressure of the pressure hull is approximately equal to the surrounding pressure.

SUMMARY OF THE INVENTION

The present invention contemplates a means to automatically maintain the internal pressure of a pressurized hull such as an underwater camera body or a waterproof container at approximately ambient pressure. Numerous sources of pressurization equalizing gas are disclosed, including high pressure gas containers coupled to the body to be pressure equalized via low pressure regulators.

In a principle embodiment of the invention, the pressurization port of the camera is attached to the second stage regulator of a diver's self-contained underwater breathing apparatus by a plug inserted in the apparatus mouth piece. The camera "breathes" through the regulator to maintain an internal pressure approximately equal to the ambient water pressure as the diver changes depth. Thus there is no limit to the depth at which the camera may operate except for the limitations of the diver.

In another embodiment of the invention, the breathing port of an underwater breathing apparatus is sealed by a membrane such as a common balloon and an underwater camera body is pneumatically connected to the sealed mouthpiece or breathing port whereby the camera body may "breathe" through the underwater breathing apparatus to maintain an internal pressure approximately equal to the ambient external pressure.

In another embodiment, a waterproof flexible container encloses a non-waterproof camera or piece of equipment. A pressure equalization means is attached to the container to maintain the pressure within equal to the surrounding ambient pressure. The container may include both rigid and flexible panels. The flexible panels are positioned to allow operation of the enclosed apparatus and the rigid sections provide protection and mounting means and an unobstructed space for operation of movable items such as automatic telephoto lenses.

DESCRIPTION OF THE DRAWINGS

FIG. 1 is a front view of a camera illustrating the pressurization and pressure relief valves.

FIG. 2 is bottom view of a camera illustrating the pressurization and relief valves.

FIG. 3 is a front view of an underwater camera with a collapsible, auxiliary air volume attached.

FIG. 4 is a side view of an underwater camera with a collapsible, auxiliary air volume apparatus attached. The dashed lines illustrate the collapsed configuration.

FIG. 5 is a front view of an underwater camera with a collapsible, auxiliary air volume apparatus attached illustrating in dash line the apparatus collapsed and rolled up.

FIG. 6 is a side view of an underwater camera with a collapsible, auxiliary air volume apparatus attached illustrating in dash line the apparatus collapsed and rolled up.

FIG. 7 illustrates an underwater camera with a pressurization equalization line attached to the low pressure, second stage regulator of a scuba apparatus.

FIG. 13 illustrates a rigid waterproof container for a video camera with flexible operation access panels, rigid means to provide space for lens operation and a pressure compensation port.

FIG. 14 illustrates an embodiment wherein a camera is contained in a waterproof, flexible container and a high pressure air source is coupled to the container via a pressure reduction regulator.

FIG. 15 illustrates an embodiment wherein a camera is contained in a waterproof, flexible container and a high pressure air source emergency breathing system is coupled to the container via a pressure reduction regulator.

DESCRIPTION OF THE INVENTION

Figure 23:
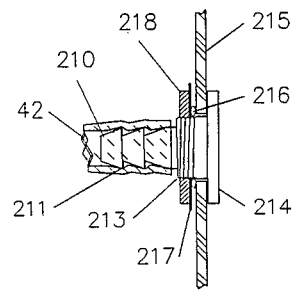
FIG. 23 illustrates an adapter for providing a means to couple a pneumatic tube to a pressure hull.

FIG. 1 illustrates a typical underwater camera with the camera body or case 10 used as the pressurization hull. The case is modified by including a one-way, pressurization valve 11. This valve may be similar to a common tire valve and its purpose is to allow the camera case to be pressurized by a simple hand pump or compressed air source. A pressure relief valve 12 is included in the camera body to prevent over pressurization of the camera. The use of a pressure relief valve simplifies pressurization by allowing an operator to apply a compressed air source to pressurization inlet valve 11 until safety valve 12 opens. Cap 13 seals the pressurization inlet valve 11 during dive operations to prevent water from entering the camera body when the external pressure exceeds the internal pressure.

This system allows operation of the camera at greater than design depths. For instance, the Cannon Aqua Snappy has a body with an operating design depth of one atmosphere or approximately 33 feet. According to this embodiment of the invention, the camera may be pressurized to at least that value. Thus the pressure relief valve 12 is set to open at one atmosphere above ambient. The camera body is pressurized until the relief valve opens to ensure that the internal pressure is one atmosphere above ambient. A protective cap 13 is placed over the pressurization inlet port 11 and the camera is ready for underwater operations. When the camera is submerged to its normal design structural limit of 33 feet, the pressure within the camera equals the external pressure of one atmosphere greater than sea level so there is no stress on the camera body. The camera may safely be submerged an additional 33 feet which places the camera at its new maximum operating depth which is a real pressure of three atmospheres. However, because the camera was pressurized to one atmosphere above sea level ambient pressure, the differential pressure at 66 feet is only one atmosphere and the camera is within its operating range.

The safety pressure relief valve 12 may include a manual pressure relief valve 14. This valve allows an operator to manually release the camera pressure so that the camera body may be opened to change film. In a preferred embodiment, the manual pressure relief valve 14 is recessed and requires a small diameter rod for actuation to preclude inadvertent operation while the camera is submerged.

FIG. 2 is a bottom view of the embodiment discussed above.

FIG. 3 illustrates an alternate embodiment where a collapsible air container 20 is attached to air inlet port 11. In this embodiment, the one-way valve within air inlet port 11 is removed to allow the free exchange of pressure between the camera body 10 and auxiliary air container 20.

In a typical operation, air container 20 has a volume equal to the volume within the camera body. In this embodiment, pressure relief valve 12 is not necessary because the camera will never become over pressurized. As the camera is submerged, container 20 collapses to maintain the air pressure within the camera body 10 equal to the external water pressure. In the exemplary case, the container 20 has a volume equal to the interior of the camera case, when the camera has been submerged to a depth of 33 feet or one atmosphere, the container 20 is completely collapsed as illustrated by dashed lines in FIG. 4 and the differential pressure between the camera and the water is zero. The camera may now be submerged to a point where the differential pressure between the camera and the exterior equal the original design depth. If desired, container 20 may have a volume greater than the volume of the camera body to permit even deeper descents. For instance, if a Nikon Action Touch camera with a design depth of only 3 meters is fitted with a container 20 having an internal volume equal to four times the internal volume of the camera, the normally shallow water camera may be operated at depths as great as 140 feet.

The preceding operations are presented as being exemplary of a system which utilizes a camera body having a one-third atmosphere operating pressure differential. If the camera body strength is greater, the benefits of this invention are appropriately increased while if the operating differential pressures are less, the basic benefits of the system are likewise reduced.

Container 20 and attached camera body 10 may be pressurized throuqh one-way valve 21. This valve is similar to that utilized in the embodiment illustrated in FIG. 1 or it may be a ball inflation valve of the type requiring a hollow needle. In this embodiment, the pressure relief valve 12 is a desirable item to prevent over pressurization of the camera body. Air bag 20 is fabricated from a material which is reinforced in such a manner that it will readily collapse but will not significantly expand when pressurized.

Assuming a camera case 10 capable of withstanding a differential pressure of one atmosphere such as the Cannon Aqua Snappy, the container/camera body is pressurized to the pressure differential limits of the camera body. When the camera is submerged to a depth of 33 feet or one atmosphere, the differential pressure is Zero and the air bag 20 is on the verge of beginning to collapse. The camera may be submerged an additional 33 feet or to a total of 66 feet and upon reaching that depth, the air bag 20 has completely collapsed as illustrated by the dashed line representation 22 of FIG. 4 but the differential pressure which the camera body 10 is experiencing is still zero. The camera body may now be submerged an additional 33 feet to 99 feet (four atmospheres) where it experiences its maximum design depth limit differential of one atmosphere.

FIGS. 5 and 6 are front and side views of an embodiment illustrating an auxiliary air chamber 30 which includes a coiling means whereby the container rolls into a coil as it collapses. The inflated configuration of the air container is illustrated by solid lines 30 in the figures and the collapsed, rolled condition is illustrated by dashed lines 32. Container 30 may be used exactly as described for 5 container 20 illustrated in FIGS. 3 and 4.

FIG. 7 illustrates a still further embodiment of the invention. The camera body 10 is pneumatically coupled to the second stage regulator 40 of a self-contained underwater breathing apparatus. In the illustrated embodiment, a Nikon Action Touch camera having a design operating depth of 3 meters is modified by replacing the battery cap with a battery cap 43 having an air inlet port 41. The air inlet port may be similar to that illustrated in FIGS. 1 through 6 so that the camera may operate as illustrated in those embodiments. In the illustrated embodiment of FIG. 7, the air inlet port 41 is a hollow tube to which a heavy walled, small diameter neoprene tubing 42 is sealed to provide a pneumatic conduit to the second stage regulator 40. In preferred embodiments, the hollow tube of inlet port 41 is provided by an adapter similar to that illustrated in FIGS. 23 through 26.

The second stage regulator fitting includes a one-way valve 43 which protects the integrity of the breathing apparatus in the event of a malfunction of the camera or if the tube 42 is severed or torn loose. The one-way valve 43 allows air from the low pressure regulator 40 to pass through tubing 42 into the camera body but will prevent water from entering the regulator in the event that tube 42 is removed. The one-way valve is coupled to the second stage regulator 40 via a chamber 44 which may be filled with a desiccant 45 such as silica gel. The chamber is sealed to the second stage regulator and includes a termination inlet port 46 which contains a gas permeable vapor barrier 47. Air inlet port 66 is larger in diameter than the tubing to accommodate the greater surface area required to allow reasonable free passage of air from the second stage regulator into the conduit to the camera via the restriction of the gas permeable vapor barrier 47. This material will allow air to pass into the camera but prevent moisture from entering the system.

Figure 8:
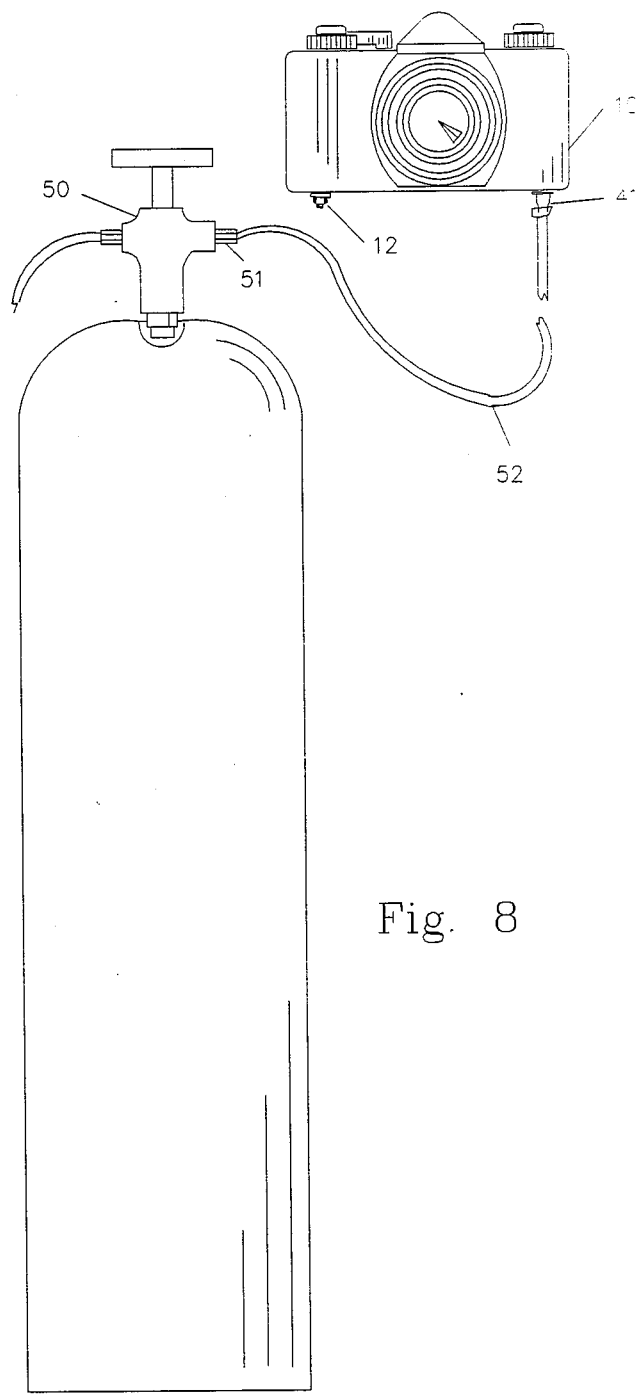
FIG. 8 illustrates an underwater camera with a pressurization line connected to the low pressure output of the first stage regulator of a scuba system.

FIG. 8 is an alternate embodiment usable with pressure hulls having a design strength capable of withstanding a pressurization equal to the low pressure output of the first stage regulator of a scuba system. In this embodiment, air line 52 is connected to a low pressure outlet of the first stage regulator 50 in much the same fashion as used to connect buoyancy controlled devices or second stage regulators to the first stage regulator of a scuba system. A quick release fitting 51 is used so that the operator may disconnect the system in the event of a failure of the line 52, pressure relief valve 12 or camera to prevent the total loss of air through the resultant open low pressure outlet.

In the embodiments illustrated in FIGS. 7 and 8, the pressure relief valve 12 automatically depressurize the pressure hull as the camera is raised to the surface. If the embodiment illustrated in FIG. 7 is modified by removing the one-way safety valve 43, the camera will automatically depressurize through the second stage regulator and safety valve 12 is not required.

The embodiments illustrated in FIGS. 7 and 8 will allow a diver to take the camera to any depth that the diver can survive.

In the embodiment illustrated in FIG. 7, a shallow water camera, such as the Nikon Action Touch camera which has a design depth of only 3 meters, may be used with comparative safety at any depth to which the diver can survive because the differential pressure between the camera and the ambient water pressure will remain at zero.

Figure 9:
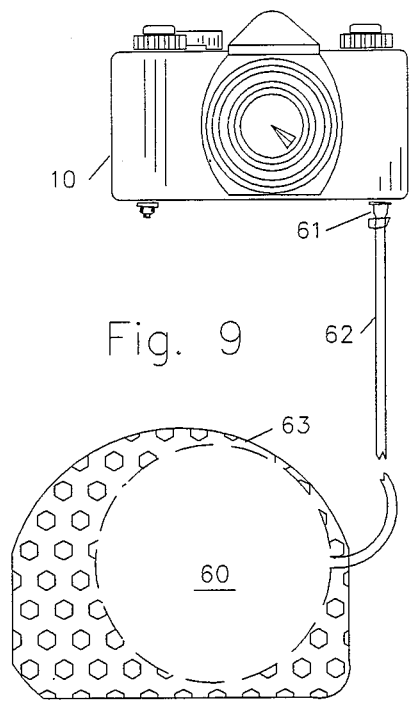
FIG. 9 illustrates an underwater camera with a pressure equalization line connected to a collapsible bladder located in a remote container.

FIG. 9 illustrates an embodiment which will allow a camera to be taken to depths equal to many times the design depth of the camera. It includes an air bladder 60 within a container 63 which may be strapped to the diver or the diver's apparatus. The air bladder may be large relative to the camera to permit operation at extreme depths. The air bladder 60 is coupled to the camera 10 via air line 62 and coupling 61 in a manner similar to that described for the embodiments illustrated in FIGS. 7 and 8. In the embodiment of FIG. 9, a pressure relief valve is not necessary because the camera will equalize on descent by the collapse of air bladder 60 and on ascent by the expansion of the air bladder.

Figure 10:
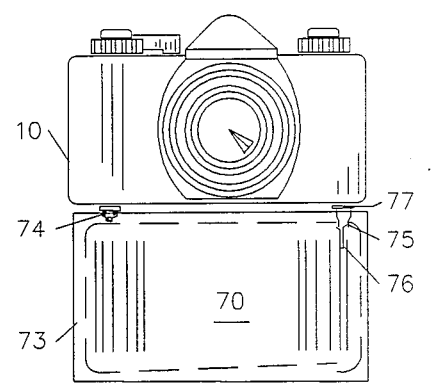
FIG. 10 illustrates an underwater camera with a hollow hand grip containing a collapsible bladder.

FIG. 10 is a further adaptation of the embodiment illustrated in FIG. 9 where the container or bag 70 is shaped in the form of a hollow handle 73 that may be secured to the camera body by the tripod attachment means 74. In this embodiment, a short air line may be used to couple bladder 70 to the camera or the bladder may be fitted with a sports ball needle valve 75 positioned to engage a hollow needle valve 76 threaded into the body of the camera. In the embodiment illustrated in FIG. 10, the battery cap 77 of the camera may be modified by boring a hole therethrough and tapping a 5/16-32 thread therein. The sports ball needle valve 76 may be threaded into the modified battery cap so that air bladder 70 will be connected directly to the camera through needle 76 by valve 75. The tripod retaining screw 78 holds the assembly securely to the base of the camera body 10 and bladder 70 is secured to the interior of the handle in the vicinity of valve 75 so that the bladder will not pull free from the valve needle 76 in the event that the camera is held underwater with the handle in the up position while the bladder is partially collapsed.

Figure 11:
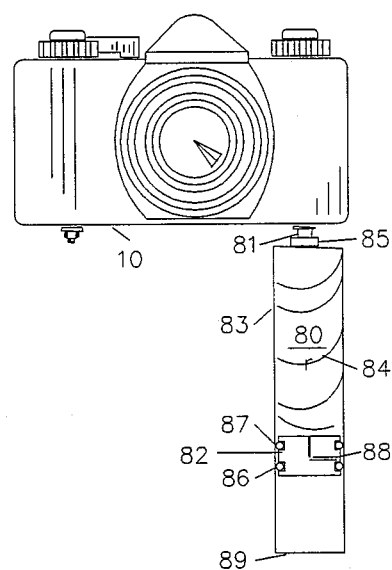
FIG. 11 illustrates an embodiment of the basic invention which includes a pressure responsive pump for pressurizing the camera case.
Figure 12:
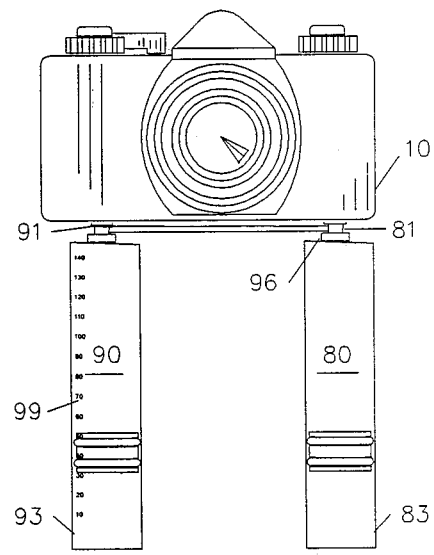
FIG. 12 illustrates the use of a pair of pressure responsive pumps for pressurizing an equipment pressure hull.

FIG. 11 illustrates an embodiment of the invention which uses a free piston pump 80 to pressurize the camera. The pump cylinder is pneumatically coupled to the air inlet of the camera body 81. The other end 84 of cylinder 80 is open to the ambient environment and a free piston 82 provides a movable gas tight seal within the cylinder. In operation, the free piston 82 is positioned at the end 89 of the cylindrical chamber 83 to provide a maximum volume between the upper surface of free piston 82 and the inlet port 81. The piston may be manually pushed into the extreme lower position by a rod or light spring 84 or simply by adding air pressure to the outlet port 85 which couples the pump to the camera inlet port 81. With the free piston 82 in the extreme down position, the pump 80 is secured to the air inlet port 81 of the camera body 10. As the assembly is submerged, external water pressure forces the free piston 82 towards the camera body, forcing air into the pressure vessel to equalize the pressure between the camera and ambient external water pressure. As the assembly ascends, the ambient pressure around the assembly is less than the pressure within the camera body so the pressure in the camera body forces the free piston 82 back down the cylinder 83 of the pump 80 The pressure is equalized within the camera body as the camera descends or ascends by movement of free piston 32. In a preferred application of this embodiment, pump 80 is configured to function as a handle.

The free piston 82 is illustrated sectioned on a plane parallel to and passing through the vertical axis to illustrate the compression "O" ring 86, the stabilizing "O" ring 87, and inner ring pressure equalization bore 88.

To increase the operational depth of the assembly, a second pump 90 may be attached as a second hand hold for the camera. The second pump 90 functions identically to the first. It may be provided with an independent portal into the camera body 10 or connected via a T connector 96 to the basic camera inlet port 81.

The cylinders 83 and 93 may be fabricated from any suitable material such as brass or steel but preferably they are fabricated from a transparent plastic so the diver may use the scale 99 as an alternate depth gauge, determine if the piston seals are leaking and ascertain when the maximum equalization depth has been reached.

FIG. 13 illustrates a television camera within a combined flexible/rigid waterproof container 110. This system includes a flexible container 114 and a rigid optical window section 115 which allows the automatic operation of a zoom lens 125. A soft flexible panel 116 is positioned in the harder flexible container 114 over the control panel 126 to permit free operation of all controls. A second optical window 117 is located in front of the monitor/view system 127 to allow the operator to aim the system and review the tape. Pressure equalization port 109 provides a means for connecting the container to any pressure equalization source. A clamp 128 seals the opening through which the camera is inserted and removed.

FIG. 14 is another example of a flexible waterproof container 100 adapted to enclose a system such as a camera to provide a waterproof housing which will allow the protected apparatus to be immersed. The waterproof housing or flexible container 100 completely encloses the exemplary apparatus 10, which is as a camera. The flexible container 100 may be optically clear whereby the camera may expose film through the side of the container. Alternately, a lens, 101 may be positioned opposite the lens opening of the camera. A pressurization port 11 provides a means for coupling a gas source to the flexible container 100. A pressure relief port 12 may be included to prevent over pressurization of the system in the event of a failure of the pressurization means and an optional, manual pressure relief valve 14 can be included for other emergencies.

Pressurization of the container 100 of FIG. 14 is achieved by a system including a high pressure gas source 130 which may be a typical $CO_2$ cartridge. The $CO_2$ cartridge is coupled via an adaptive fitting 140 to the input 122 of a low pressure regulator 120. The low pressure regulator includes an outlet port 121 which is pneumatically coupled to the pressurization port 110 of container 100. A pressure relief port 123 is incorporated in the low pressure regulator 120 so that the system may "breathe". Thus as the system is submerged, high pressure gas from the $CO_2$ container 130 or similar gas source is reduced to ambient pressure by regulator 120. The ambient pressure is coupled to the interior of the container 100 or, in alternate embodiments, directly to the pressurized hull of a waterproof system. As the system is raised towards the surface, excess pressure within the container exit through the pressure relief valve 123.

An adaptation of the FIG. 14 embodiment is illustrated in FIG. 15. It uses an emergency breathing apparatus 131 in place of the $CO_2$ cartridge 130 and regulator 120. The "SPARE AIR" system, produced by Submersible Systems, Inc. is typical of the many emergency breathing systems that may be employed as a gas source in this adaptation. Emergency breathing devices of this type usually have a regulator rigidly attached to an air supply tank.

Figure 16:
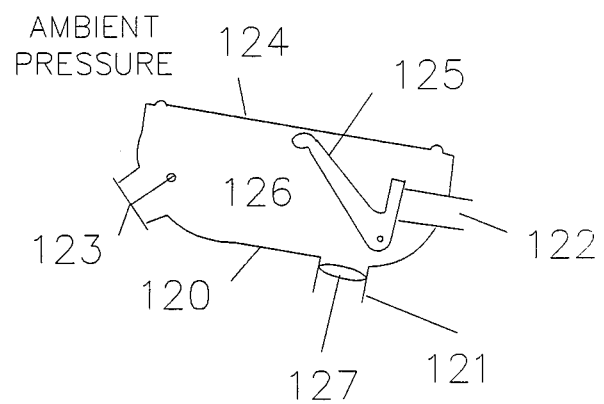
FIGS. 16 through 18 are a stylized schematic illustration of a low pressure regulator of the type contemplated to provide an air source for a pressure equalized system whereby the pressure within the system is maintained at approximately ambient pressure.
Figure 17:
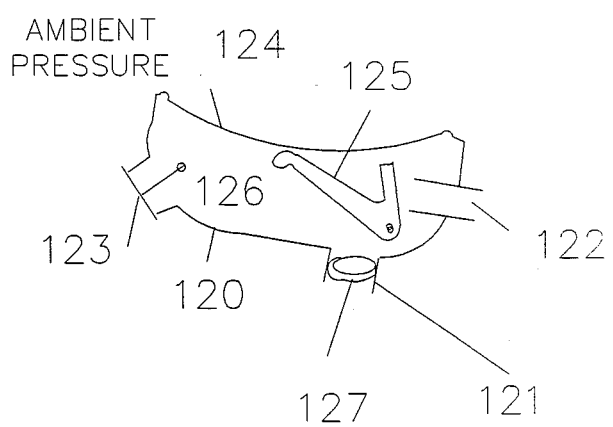
Figure 18:
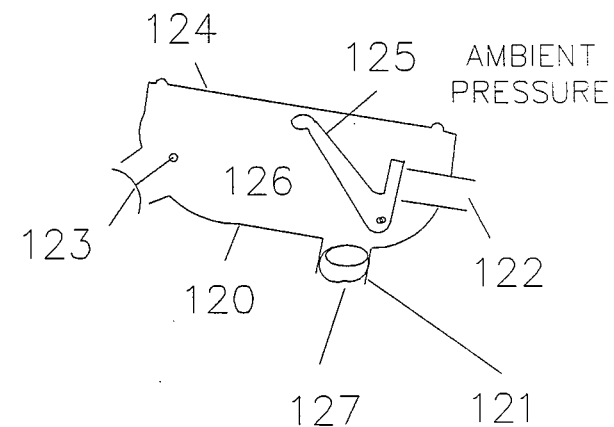

FIGS. 16 through 18 illustrate graphically and in more detail the actual operation of a typical low pressure regulator. In such systems, the regulator 120 is fabricated from a rigid housing and includes a flexible diaphragm 124. One side of the flexible diaphragm is exposed to ambient pressure and the other side to pressure chamber 126 within the regulator. The housing of the regulator is sealed to create the pressure chamber 126, with three controlled ports; a gas inlet port 122, a pressure relief valve 123, and an outlet port 121. Outlet port 121 is equivalent to the mouthpiece outlet in a scuba system second stage regulator. It is fundamental to this invention that the outlet port be sealed. With the port sealed by a means such as plug 127, the pressure within chamber 126 tracks the ambient exterior pressure as explained in the following paragraph. Thus when a waterproof camera or other pressure hull is pneumatically coupled to chamber 126, the pressure within the camera or hull is kept approximately equal to ambient external pressure.

When the system is in a quiescent condition, diaphragm 120 is in a neutral state and the lever operated valve 125 closes off the high pressure inlet 122, see FIG. 16. In FIG. 17, the regulator 120 is subjected to an increased relative external pressure which causes diaphragm 124 to be flexed into the regulator pressure chamber 126. This moves lever valve 125 to open the high pressure inlet port 122 to admit high pressure gas into the regulator pressure chamber 126 and out through the breathing output port 121. As soon as the pressure within the regulator 120 and anything attached to the outlet port 121 reaches ambient pressure, the diaphragm 124 returns to the position illustrated in FIG. 16 to close off the high pressure port 122. When the external relative pressure is decreased, as when the system is raised towards the surface with outlet port 121 sealed or if a user exhales into the outlet port 121 which is the mouthpiece of the regulator is being used as a second stage regulator in a self-contained underwater breathing apparatus, diaphragm 124 flexes outward slightly as illustrated in FIG. 18 and pressure relief valve 123 opens to allow the interior of the regulator 120 and any system coupled to the regulator output port 121 to reach ambient pressure. As soon as ambient pressure is established within the regulator and attached system, the pressure relief valve 123 closes.

Figures 19, 20:
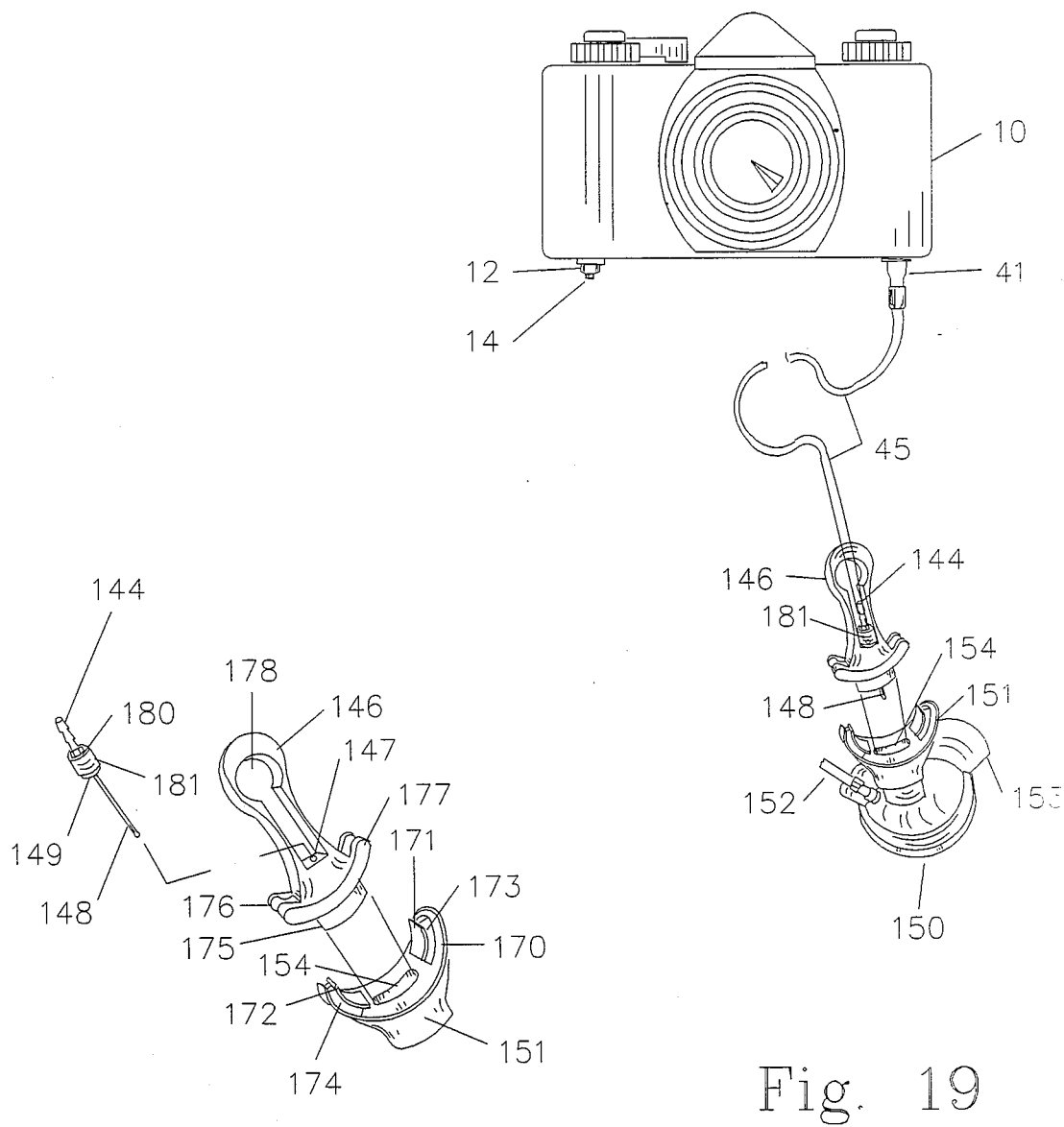
FIG. 19 illustrates an embodiment of the invention where a camera is pneumatically coupled to the second stage regulator of an underwater breathing apparatus via a plug adaptor in the mouthpiece of the system's second stage regulator.
FIG. 20 is an exploded view of an underwater breathing apparatus second stage regulator mouthpiece adaptor plug for coupling the second stage regulator to the system to be pressure equalized.

In FIG. 19, a low pressure regulator, the second stage regulator 150 includes a pressurized gas input coupling 152 which is connected via a low pressure line to a low pressure output port of the high pressure regulator of the scuba system in much the same way as air line 52 is coupled to the low pressure output port of the first stage regulator in FIG. 8. The exhaust port 153 functions as a pressure relief valve in exactly the same way as illustrated for exhaust valve 123 in FIGS. 16 through 18 and the mouthpiece 151 and its air passage 154 is identical to the outlet port 121. A plug 146 completely closes off the air outlet 154 of mouthpiece 151 so that a chamber within the regulator will track the external ambient pressure as explained with respect to FIGS. 16 through 18. Plug 146 also provides a means for pneumatically coupling, via a plastic tube 145, the chamber within regulator 150 and the inlet or pressure compensation port 41 of the camera 10.

A safety pressure relief valve 12 may be used to prevent over pressurization of the system in the event of free flowing of the second stage regulator 150. Thus if the second stage regulator fails and begins to free flow and the exhaust port 153 fails to open, the camera system will be protected and excess gas pressure will escape through the relief valve 12 as opposed to blowing out the seals of the system or plug 146 from the mouthpiece 151.

FIG. 20 is an exploded view of plug 146 and mouthpiece 151 of FIG. 19. The illustrated plug is similar to the plug disclosed in U.S. Pat. No. 4,079,735, but it is modified to include a small bore 147 along the longitudinal axis. This bore allows the adapter needle 148 to pass through the plug and provide an air passage into the mouthpiece outlet 154 and chamber within the regulator. Adapter needle 148 is part of a standard sports ball needle valve inflation needle 149 fitted with a special barb 144 that threads into a threaded bore 180 in an adapter such as a modified tire valve cover 181 which is screwed onto the needle valve inflator 149 and bored and tapped to provide the coupling means for the barb 144 which secures a plastic tube.

In FIGS. 19 and 20, plug 146 is adapted to fit within the mouthpiece of 151 of a standard demand type second stage air pressure regulator which function as schematically illustrated in FIGS. 16 through 18. Regulator 150 receives air at typically 100 to 160 PSI and supplies it at ambient pressure upon demand through the mouthpiece opening 154 when a diver reduces pressure by inhaling through the mouthpiece. Mouthpiece 151 is semi-cylindrical with a mouth engaging surface 170 which, in use, rests against the outside of the lips of the user who holds the mouthpiece in his teeth by clamping them on spacers 173 and 174 which support flanges 171 and 172.

The mouthpiece plug 146 is oval in the end region 175 and tapers slightly, being of smallest cross section at the end. It is dimensioned to fit into a standard mouthpiece opening 154. A first and second pair of locking arms 176 and 177, on opposite sides of the plug, are adapted, when engaged with mouthpiece 151, to fit under flanges 172 and 172 to secure the plug in a sealing engagement with the mouthpiece. In this way, not only is mouthpiece plug 146 locked into position with tapered end 175 in opening 154 and thereby closing it off.

An opening 178 in an opposite end region to that of the tapered end region 175 is dimensioned to receive typical needle valve inflation adapter 146 such as is used to inflate sports balls. A small diameter bore 147 passes longitudinally through the tapered region of the plug 175 so that the needle 148 of the needle valve inflation adapter 149 may be inserted through the plug with its end entering the mouthpiece bore 154 and chamber of the regulator. In the illustrated embodiment, a barb 144 receives and securely holds a hose member such as the plastic tube 42 of FIG. 19. In a preferred embodiment, barbed coupling 144 is an off the self item having a 10/32 threaded end which is screwed into a threaded bore 180 in the top of a standard, high pressure tire valve cover 181. The valve cover 181 is screwed onto the needle valve inflator 149 to provide a gas tight seal.

Figures 21, 22:
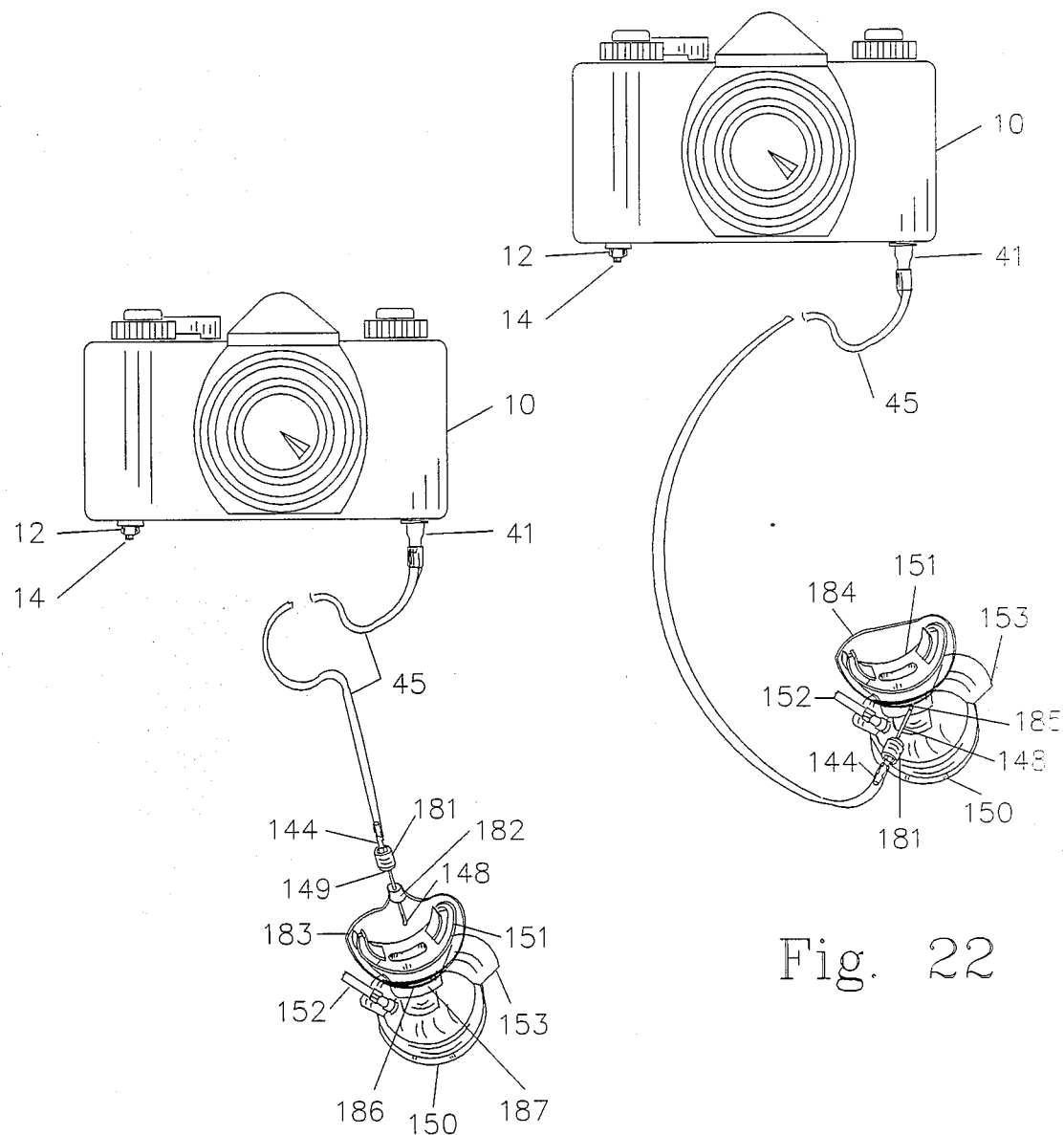
FIG. 21 illustrates an embodiment of the invention where a camera is pneumatically coupled to the second stage regulator of an underwater breathing apparatus via a waterproof closure.
FIG. 22 illustrates an embodiment of the invention where a camera is pneumatically coupled to the second stage regulator of an underwater breathing apparatus via a tube inserted into the mouthpiece which is sealed by a covering.

An alternate means for sealing the air passage, 154 of the mouthpiece is with a cover such as cover 183 illustrated in FIG. 21. This cover is fabricated from a gas impervious material such as plastic or rubber The cover opening 186 which is secured about the tubular section 187 of the mouthpiece which couples the lip engaging portion of the mouthpiece to the second stage regulator 150. The opening of the cover may be secured by a variety of mechanical devices but in a preferred embodiment, the opening includes a resilient band which creates an elastic opening having a diameter smaller than tube 187. The cover is placed over the mouthpiece by stretching opening 186 over the flanges and allowing it to restrict about the mouthpiece tube 187 to seal the mouthpiece opening and second stage regulator chamber. The effects of the cover may be visualized by referring to FIGS 16 through 18. In these figures, the cover replaces plug 127 to seal opening 121 so that chamber 126 is maintained at a pressure approximately equal to the ambient pressure by the breathing action created by diaphragm 124 and the associated valve 125 coupled with the ambient pressure responsive exhaust valve 123.

In FIG. 21, a needle valve 182 is provided in the cover so that a hollow needle 148 may be inserted into the cavity created by the cover to permit camera 10 to be pneumatically coupled to the chamber within the second stage regulator. Thus the camera will breathe through the second stage regulator. That is, when the camera and second stage regulator are subjected to an increased pressure, the second stage regulator will allow gas from a higher pressure source to enter the second stage regulator chamber as illustrated in FIG. 17. The hollow needle 148 passing through needle valve 182 allows the increased pressure within the chamber to be transmitted through tubing 42 to the camera 10. As the camera and second stage regulator are raised to a shallower depth, the reduction in ambient pressure causes exhaust valve 123 of FIG. 18 to open and reduce the pressure within the second stage regulator chamber. The reduction of the pressure within this chamber is reflected by a reduction of pressure within the camera due to the pneumatic coupling through the hollow needle 148.

FIG. 22 illustrates the best mode of practicing the invention. In this mode, a cover 184 seals the mouthpiece 151 to provide an operation of the second stage regulator exactly as described for FIGS. 16 through 21. The primary distinction in this embodiment is the way in which the air passage through the mouthpiece is sealed. In FIG. 22, the cover 184 does not contain a needle valve or any other means to allow the camera to be connected to the chamber within the second stage regulator. In this embodiment, the cover 184 is a simple balloon whose mouth is stretched over the flanges of the mouthpiece and allowed to snap about the mouthpiece tube connected to the second stage regulator. This creates a seal similar to the elastic seals suggested for the embodiment illustrated in FIG. 21. The invention is perfected in the embodiment by creating a small hole, 185 in the mouthpiece tube by forcing a darning needle or similar device through a side wall of the mouthpiece connecting tube. For all practical purposes, this small diameter hole through the mouthpiece connecting tube seals when the mouthpiece is used for its normal purpose of allowing a diver to breathe through the apparatus. However, it allows the insertion of a hollow needle 148 and thereby functions similar to needle valve 182 of FIG. 21.

In the preferred embodiment of FIG. 22, extended depth operation of an underwater apparatus is achieved through the method of sealing the mouthpiece of a second stage scuba regulator with a balloon or any convenient means such as a plug, tape or any other apparatus capable of performing a sealing function. A hollow needle is connected via a pneumatic coupling to the pressure hull, which is a camera in the illustration. A hole is formed in the side wall of the mouthpiece tube and the needle is inserted therethrough. Once the needle is inserted through the side wall of the mouthpiece tube, the pressure within the pressure hull is maintained at approximately the ambient pressure through the pressure demand functions of the second stage regulator. That is, when the second stage regulator and pressure hull are submerged to an increased depth, the resultant increased pressure causes the second stage regulator's chamber to undergo an increasing pressure from a higher pressure source via inlet tube 152. Thus the pressure within the pressure hull is increased as it tracks the pressure within the second stage regulator chamber. When the pressure hull and second stage regulator are raised to a shallower depth, the reduced ambient pressure causes the exhaust valve of the second stage regulator to vent until the pressure within the second stage regulator chamber and the pressure hull match ambient pressure.

The pressurization or pressure equalization ports 41 or 61 illustrated in the various figures in this patent are provided by an adapter similar to those illustrated in FIGS. 23 through 26. The adapter includes a coupling section 210 which is dimensioned to fit within the pneumatic coupling tube 42. The exterior surface of the coupling section may include a section of increased diameter of a smoothly rounded surface or an angular surface such as the barbs 211 illustrated in FIGS. 23 through 26. The purpose of the enlarged radius section 211 is to improve mechanical and pneumatic security between the adapter and pneumatic tube. A clamp may be provided to increase the mechanical and pneumatic security but under most circumstances, the barbed embodiment provides an adequate means to prevent the pneumatic tube 42 from being pulled free of the adapter. The coupling section 210 is connected to a threaded section 213 by a transition section 222. A flange 214 is provided at the end of the adapter opposite the coupling section. The flange provides a stop so that the adapter may be secured to a pressure hull by inserting it through an appropriately dimensioned hole and threading a nut on the threaded section 213.

The adapter is used by barring a hole of adequate size through the wall of the pressure hull or camera body 215. The adapter is pushed through the hole from inside of the pressure hull and nut 218 is threaded onto the threaded portion 213 to clamp the pressure hull wall 215 between the backing flange 214 and the nut 218. An O-ring, grommet or similar sealing device 216 may be placed between the pressure hull wall 215 and a washer 217 to provide the required pneumatic seal. The nut 218, washer 217, sealing ring 216, and pressure hull wall 215 are illustrated as cutaway in FIG. 23 to more clearly portray the adapter.

Figure 24:
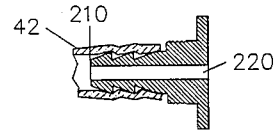
FIG. 24 is a sectional view of the adapter illustrated in FIG. 23 taken along lines A—A.
Figure 25:
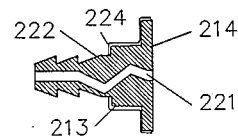
FIG. 25 is a sectional view of the adapter illustrated in FIG. 23 taken alone lines A—A and showing an alternate, light impervious pneumatic passage.
Figure 26:
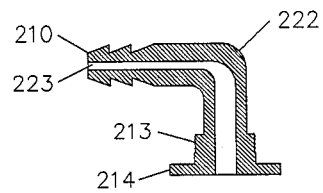
FIG. 26 is a sectional view of an adapter similar to that illustrated in FIG. 24 but including a curved section.

In the basic embodiment, a bore 220 of FIG. 24 is provided through the center of the adapter to complete a pneumatic passage from the coupling tube 42 to the interior of the pressure hull. If the pressure hull is a camera, a tortuous passage, 221 of FIG. 25, is preferred. It provides a non-direct pneumatic path through the adapter to preclude the possibility of light entering the camera body through the pneumatic passage and ruining film. To further minimize the possibility of light entering the camera through the adapter, the inside of the passage may be provided with a non-reflective finish or coating which may also be light absorptive. A further embodiment is illustrated in FIG. 26 where section 222 coupling the tubular connecting end 210 of the adapter to the threaded portion 213 is bent at an angle so that the pneumatic coupling tube may lie at a more desirable angle relative to the pressure hull wall and further, if a camera body is the pressure hull, the curve in the pneumatic passage 223 will prevent light from entering the camera body, especially if the interior wall of passag 223 is treated with a non-reflective, light absorptive coating or texture. In FIG. 25, a resilient sealing material 224 is coated on the portion of the flange 214 and threaded portion 213 which abuts the pressure hull to effect a gas tight seal when the adapter is installed.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus, for use with a self-contained underwater breathing apparatus of the type which includes a pressure demand regulator, for extending the operational depth of an underwater device of the class which includes a waterproof, pressure hull, comprising:
   means for sealing the breathing outlet of said regulator for creating a pressure chamber within the body of said regulator;
   a pneumatic port pressure compensating said pressure hull; and
   means for pneumatically connecting said pneumatic port to said regulator chamber.

2. An apparatus as defined in claim 1, wherein said connecting means includes a flexible conduit means pneumatically coupling said pressure chamber to said pressure hull.

3. An apparatus as defined in claim 1, wherein said means for connecting said pressure chamber to said pneumatic port comprises a needle valve inflation needle.

4. An apparatus as defined in claim 1 wherein said pneumatic connection includes a gas permeable, moisture barrier of the class which will allow air to pass into said passage from said regulator but will prevent water from entering said passage from said regulator.

5. An apparatus as defined in claim 1, further comprising a desiccant chamber for drying gas passing from said regulator chamber to said pressure hull.

6. An apparatus as defined in claim 1, wherein said self-contained underwater breathing apparatus is a self-contained emergency air source including an air reservoir rigidly connected to said regulator.

7. An apparatus as defined in claim 1 wherein said regulator includes exhaust valve means responsive to external ambient pressure for permitting gas to escape from said chamber when the pressure within said pressure hull is greater than ambient.

8. An apparatus as defined in claim 1 wherein said means for sealing the breathing outlet of said regulator is a plug dimensioned to fit within said breathing outlet.

9. An apparatus as defined in claim 8 wherein said plug includes a small diameter bore normally closed by the resiliency of the plug material when said plug is installed in said regulator, and said pneumatic connection means includes a hollow inflation needle means for creating a pneumatic passage through said bore in said plug into said regulator chamber when said needle is inserted in said bore.

10. An apparatus as defined in claim 1 wherein the breathing outlet is a mouthpiece including a tubular extension from said regulator chamber which terminates in a mouth engaging flange.

11. An apparatus as defined in claim 10 wherein said means for sealing the breathing outlet of said regulator is a cover adapted to seal about said tubular extension of said mouthpiece.

12. An apparatus as defined in claim 11 wherein said pneumatic connection means includes a hollow needle inserted through one wall of the material of said mouthpiece tubular extension between said regulator chamber and said cover.

13. An apparatus as defined in claim 11 comprising a needle value in said cover and said pneumatic connection means includes a hollow inflation needle means for providing a gas passage through said needle valve.

14. An apparatus as defined in claim 1 wherein said pressure compensating port includes an adapter, comprising:
   coupling means for engaging the interior of a tubular passage dimensioned relative to the interior of said tubular passage to provide a mechanically secure, pressure tight seal;
   a flange means at the end of said adapter opposite said coupling means;
   a threaded exterior section between said flange and said coupling means; and
   a pneumatic passage through the body of said adapter for providing a gas conduit between openings in the coupling means end and flange end of said adapter.

15. An apparatus as defined in claim 14 wherein said pneumatic passage describes a tortuous path through the body of said adapter for preventing light from passing therethrough.

16. An apparatus as defined in claim 14 wherein said adapter includes a curved section between said coupling means and said flange .

17. An apparatus as defined in claim 14 wherein said pneumatic passage is provided with a light absorptive interior surface.

18. An apparatus as defined in claim 14 wherein said adapter includes a resilient coating in the areas abutting said pressure hull.

19. An apparatus, for use with a self-contained underwater breathing apparatus of the type which includes a pressure demand regulator, for extending the operational depth of a waterproof camera, comprising:
   means for sealing the breathing outlet of said regulator for creating a pressure chamber;
   a port for pressure equalizing said camera; and
   means for pneumatically connecting said port to said pressure chamber for supplying a gas at approximately ambient pressure to said camera.

20. An apparatus as defined in claim 19, wherein said connectinq means includes a flexible conduit pneumatically coupling said pressure chamber to said camera.

21. An apparatus as defined in claim 19, wherein said means for connecting said pressure chamber to said port comprises a needle valve hollow inflation needle.

22. An apparatus as defined in claim 19 wherein said pneumatic connection includes a gas permeable, moisture barrier of the class which will allow air to pass into said passage from said regulator but will prevent water from entering said passage from said regulator.

23. An apparatus as defined in claim 19, further comprising a desiccant chamber for drying gas passing from said pressure chamber to said camera.

24. An apparatus as defined in claim 19, wherein said self-contained underwater breathing apparatus is a self-contained emergency air source including an air reservoir rigidly connected to said regulator.

25. An apparatus as defined in claim 19 wherein said regulator includes exhaust valve means responsive to external ambient pressure for permitting gas to escape from said chamber when the pressure within said camera is greater than ambient.

26. An apparatus as defined in claim 19 wherein said means for sealing the breathing outlet of said regulator is a plug dimensioned to fit within said breathing outlet.

27. An apparatus as defined in claim 26 wherein said plug includes a small diameter bore normally closed by the resiliency of the plug material when said plug is installed in said regulator, and said pneumatic connection means includes a hollow inflation needle means for creating a pneumatic passage through said bore in said plug into said pressure chamber.

28. An apparatus as defined in claim 19 wherein said breathing outlet is a mouthpiece including a tubular extension from said pressure chamber which terminates in a mouth engaging flange.

29. An apparatus as defined in claim 28 wherein said means for sealing the breathing outlet of said regulator is a cover adapted to seal about the tubular extension of said mouthpiece.

30. An apparatus as defined in claim 29 wherein said pneumatic connection means includes a hollow needle inserted through one wall of the material of said mouthpiece tubular extension between said regulator and said cover.

31. An apparatus as defined in claim 29 comprising a needle value in said cover and said pneumatic connection means includes a hollow inflation needle means for providing a gas passage through said needle valve.

32. An apparatus as defined in claim 19 wherein said pressure compensating port includes an adapter, comprising:
  coupling means for engaging the interior of a tubular passage dimensioned relative to the interior of said tubular passage to provide a mechanically secure, pressure tight seal;
  a flange means at the end of said adapter opposite said coupling means;
  a threaded exterior section between said flange and said coupling means; and
  a pneumatic passage through the body of said adapter for providing a gas conduit between openings in the coupling means end and flange end of said adapter.

33. An apparatus as defined in claim 32 wherein said pneumatic passage describes a tortuous path through the body of said adapter for preventing light from passing therethrough.

34. An apparatus as defined in claim 32 wherein said adapter includes a curved section between said coupling means and said flange.

35. An apparatus as defined in claim 32 wherein said pneumatic passage is provided with a light absorptive interior surface.

36. An apparatus as defined in claim 32 wherein said adapter includes a resilient coating in the areas abutting said camera.

37. A method for extending the depth range of an underwater apparatus, including the steps of:
  sealing the breathing port of the regulator of an underwater breathing apparatus;
  pneumatically coupling the underwater apparatus to a chamber created by sealing said breathing port; and
  pressurizing and depressurizing said underwater apparatus through the normal pressure demand functions of the regulator.

38. A method of extending the depth range of an underwater apparatus as defined in claims 37, wherein said breathing port is coupled to a pressure demand regulator of a self-contained underwater breathing apparatus.

* * * * *